(12) United States Patent
Von Helmolt et al.

(10) Patent No.: US 7,809,613 B2
(45) Date of Patent: Oct. 5, 2010

(54) METHODS AND SYSTEMS FOR MANAGING DEALER INVENTORIES

(75) Inventors: Hans-Ulrich A. Von Helmolt, Heidelberg (DE); Andreas Huber-Buschbeck, Heiligkreuzsteinach (DE)

(73) Assignee: SAP AG, Walldorf (DE)

( * ) Notice: Subject to any disclaimer, the term of this patent is extended or adjusted under 35 U.S.C. 154(b) by 32 days.

(21) Appl. No.: 12/065,893

(22) PCT Filed: Sep. 7, 2005

(86) PCT No.: PCT/EP2005/054434

§ 371 (c)(1),
(2), (4) Date: Mar. 5, 2008

(87) PCT Pub. No.: WO2007/028420

PCT Pub. Date: Mar. 15, 2007

(65) Prior Publication Data

US 2008/0249900 A1    Oct. 9, 2008

(51) Int. Cl.
*G06F 17/60* (2006.01)
(52) U.S. Cl. .......................... 705/28; 705/10; 707/200; 707/E17.001; 700/99; 700/106
(58) Field of Classification Search .................. 705/28; 707/200
See application file for complete search history.

(56) References Cited

U.S. PATENT DOCUMENTS 6,754,637 B1 *   6/2004   Stenz .......................... 705/26
7,069,230 B2 *   6/2006   Krystek et al. ................. 705/9

* cited by examiner

*Primary Examiner*—Vanel Frenel
(74) *Attorney, Agent, or Firm*—Blakely, Sokoloff, Taylor & Zafman, LLP (57) ABSTRACT

A computer-implemented method and system for maintaining a plurality of dealer inventories in a supply chain management system comprising a plurality of dealer inventory data objects representing dealer inventories, a plurality of interfaces for accessing the dealer inventory data objects and a plurality of participants within the supply chain management system, wherein the dealer inventory data objects are stored with the supply chain management system; the dealer inventory data objects located with the supply chain management system of a second participant are owned by a first participant; the participants are accessing the dealer inventory data objects, wherein the first and the second participant having read and write permissions and the further participants having read permissions; and the interfaces are adapted to support online collaboration between the participants.

12 Claims, 5 Drawing Sheets

METHODS AND SYSTEMS FOR MANAGING DEALER INVENTORIES

This is a non-provisional application of International Application No. PCT/EP2005/054434, filed Sep. 7, 2005.

BACKGROUND OF THE INVENTION

The present invention relates generally to methods and systems for managing inventories within one or more e-business systems. Such an e-business system may comprise procurement systems, sales information systems, purchasing systems, logistic information systems or supply chain management systems. More particularly, the present invention relates to methods and systems for managing dealer inventories within at least one supply chain management system. One aspect of this invention is the support of an online collaboration between the supply chain management systems.

Today, the success of a business company depends essentially on the requirement that customer demands on goods and/or services be fulfilled precisely, cost-efficiently and in time. Therefore, many companies make use of a supply chain management system to control and optimize their production and delivery processes.

Supply chain management may comprise the process of controlling the flow of goods, services, information and/or finances between the involved parties such as manufactures, suppliers, wholesalers, retailers, and consumers. This process may include, among others, order processing, information feedback, and timely delivering the ordered goods and/or services.

One part of the supply chain management is the administration of the inventory in several warehouses, whereby the warehouses can be located with each participant, e.g. manufacturer, dealer, middleman or supplier which is involved in the supply chain. In this supply chain, a participant can act either as a supplier or as a customer. Each participant manages his own inventory whereby the stock may be located with other participants.

STATE OF THE ART

In supply chain management systems the stock is maintained as inventory data objects by the owner of the inventory. Currently, an inventory may reflect three different situations:
- a company is the owner of the inventory and the stock is located with the company;
- a company is the owner of the inventory and the stock is located with the customer or supplier;
- a company is not the owner of the inventory but the stock is located with the company.

SUMMARY OF THE INVENTION

The present invention, in one aspect, provides a computer-implemented method for maintaining a plurality of dealer inventories in a supply chain management system, comprising a plurality of dealer inventory data objects which represent the plurality of dealer inventories, a plurality of interfaces for accessing the plurality of dealer inventory data objects and a plurality of participants within the supply chain management system, wherein
  the dealer inventory data objects are stored with the supply chain management system;
  the dealer inventory data objects, located with the supply chain management system of a second participant, are owned by a first participant;
  the first participant accesses the dealer inventory data objects via the interfaces, whereby the first participant having read and write permissions for the dealer inventory data objects;
  the second participant accesses the dealer inventory data objects via the interfaces, whereby the second participant having read and write permissions for the dealer inventory data objects;
  further participants access the dealer inventory data objects via the interfaces, whereby the further participants having read permissions for the dealer inventory data objects; and
  the interfaces are adapted to support online collaboration between the plurality of participants.

The dealer inventories are owned by a first participant, the dealer, and stored as dealer inventory data objects within a supply chain management system which is located with a second participant, the manufacturer. The dealer provides information about his inventories to the manufacturer. The dealer and the manufacturer both have read and write access permissions for these dealer inventory data objects. Other participants, e.g. a second dealer, have only read permissions for the dealer inventory data objects which are owned by a first participant. Therefore, the manufacturer has information about the inventory of several dealers and can sell the products to a customer in order of a dealer. The products sold by the manufacturer are delivered by the respective dealer.

In a further embodiment of the invention, the interfaces are adapted for performing at least one of the following functions:
  inserting a time series comprising one or more dealer inventory data objects into a plurality of data storages,
  inserting a dealer inventory data object into the time series,
  updating a time series comprising one or more dealer inventory data objects,
  updating a dealer inventory data object,
  removing a time series from the plurality of data storages in consideration of the owner of the time series,
  removing a dealer inventory data object from a time series in consideration of the owner of the dealer inventory data object,
  reading dealer inventory data objects which are owned by other participants;
  searching the plurality of dealer inventory data objects for one or more dealer inventory data objects with respect to one or more search criteria,
  displaying one or more dealer inventory data objects, and
  monitoring the plurality of dealer inventory data objects.

All functions which are necessary for maintaining and managing the dealer inventory data objects with the manufacturer are provided by the inventive method. These functions are executable using the interface which is located with the supply chain management system.

Further, a dealer inventory data object may comprise:
  an ID representative of the dealer inventory data object,
  an ID representative of the owner of the dealer inventory data object,
  a ID representative of a product,
  a number representative of the product allocation within the dealer inventory data object, and
  a number representative of the sold quantity of products within the product allocation.

All necessary information about the dealer inventory is stored within the dealer inventory data objects. The inventive method can calculate the available quantity of a product from the difference between the product allocation and sold quantity.

The dealer inventory data object may further comprise a flag indicating as to whether the dealer inventory data object is blocked for the owner.

Using such a flag, a dealer inventory data object may be blocked for the owner or may be blocked for selling if the dealer does not fulfill the terms of contract.

In a further embodiment of the invention, the dealer inventory data objects are stored as one or more time series.

One advantage is that the dealer inventory data objects, especially the product allocation, may vary over time.

In a further embodiment of the invention, the following steps may be implemented:

performing an availability check based upon the dealer inventory, checking as to whether the ordered quantity of goods is available within the dealer inventory, confirming the customer order by the second participant if the ordered quantity of goods is available within the dealer inventory, reducing the available quantity of products within the dealer inventory data objects if the ordered quantity of goods is available within the dealer inventory, forwarding the customer order to the first participant if the ordered quantity of goods is available within the dealer inventory, and rejecting the customer order by the second participant if the ordered quantity of goods is not available within the dealer inventory.

The complete availability check can be performed by the manufacturer. The manufacturer can decide whether the dealer is able to deliver the required quantity of products or not. If so, the manufacturer forwards the customer order to the dealer.

Furthermore, the invention comprises a computer-readable storage medium comprising program code for performing the inventive methods, when loaded into a computer system.

BRIEF DESCRIPTION OF DRAWINGS

The accompanying drawings, which constitute a part of this disclosure, illustrate various embodiments and aspects of the present invention and, together with the description, explain the principles of the invention.

In the drawings.

DETAILED DESCRIPTION

In a supply chain, dealers are a special kind of business partners. They can either act as a customer or as a supplier for other customers. This invention is directed toward dealers who act as supplier whereby a manufacturer sells the products owned by the dealer by order of the dealer.

Figure 1:
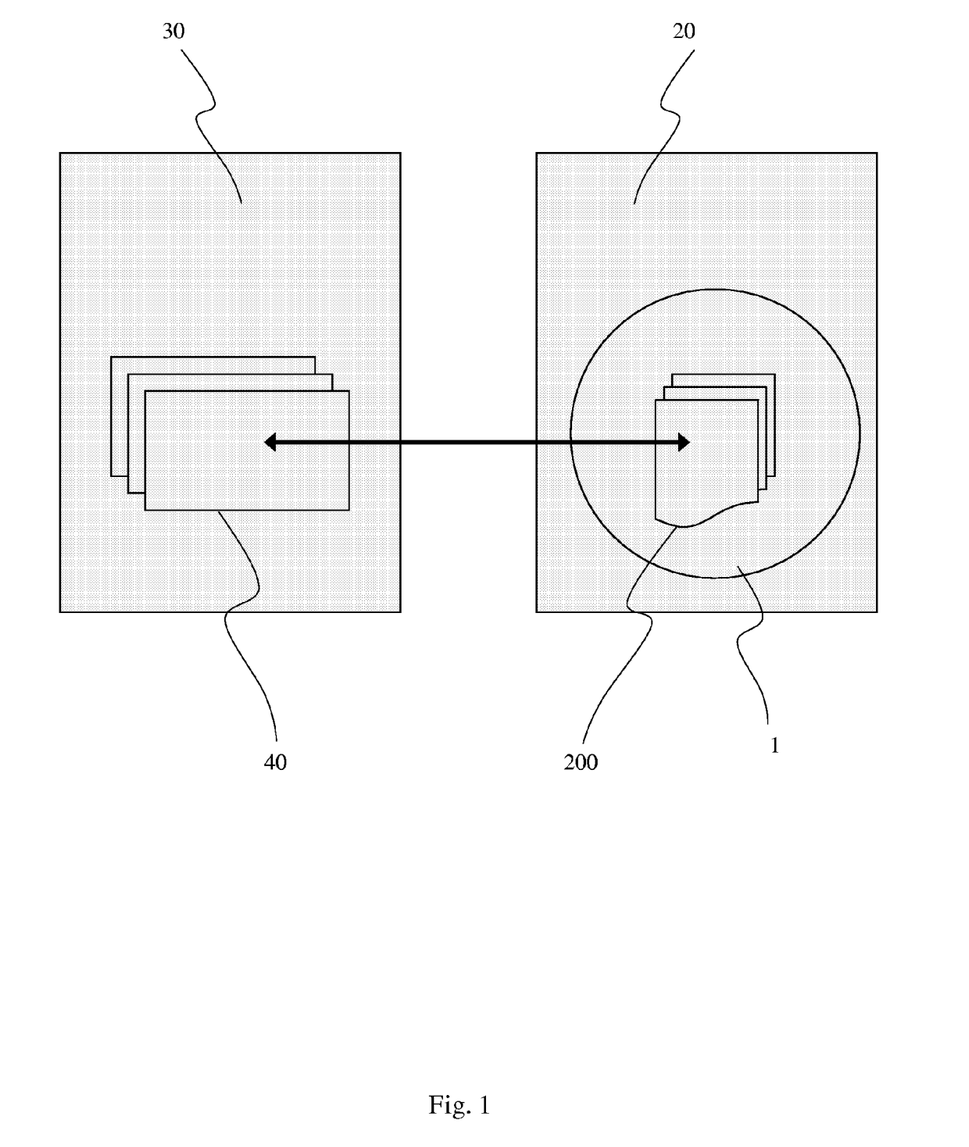
FIG. 1 illustrates the location of the products an their associated dealer inventory.

FIG. 1 shows the relationship between a dealer 30 who acts as a supplier, and a manufacturer 20. In this embodiment the products 40 are located with the dealer 30 and their associated dealer inventory 200 is located at the manufacturer, whereby the dealer inventory 200 is stored and maintained by a supply chain management system 1. In this case, the dealer is the owner of the products or goods 40 and of the dealer inventory 200.

The owner of a dealer inventory has the possibility to maintain the dealer inventory.

Figure 2:
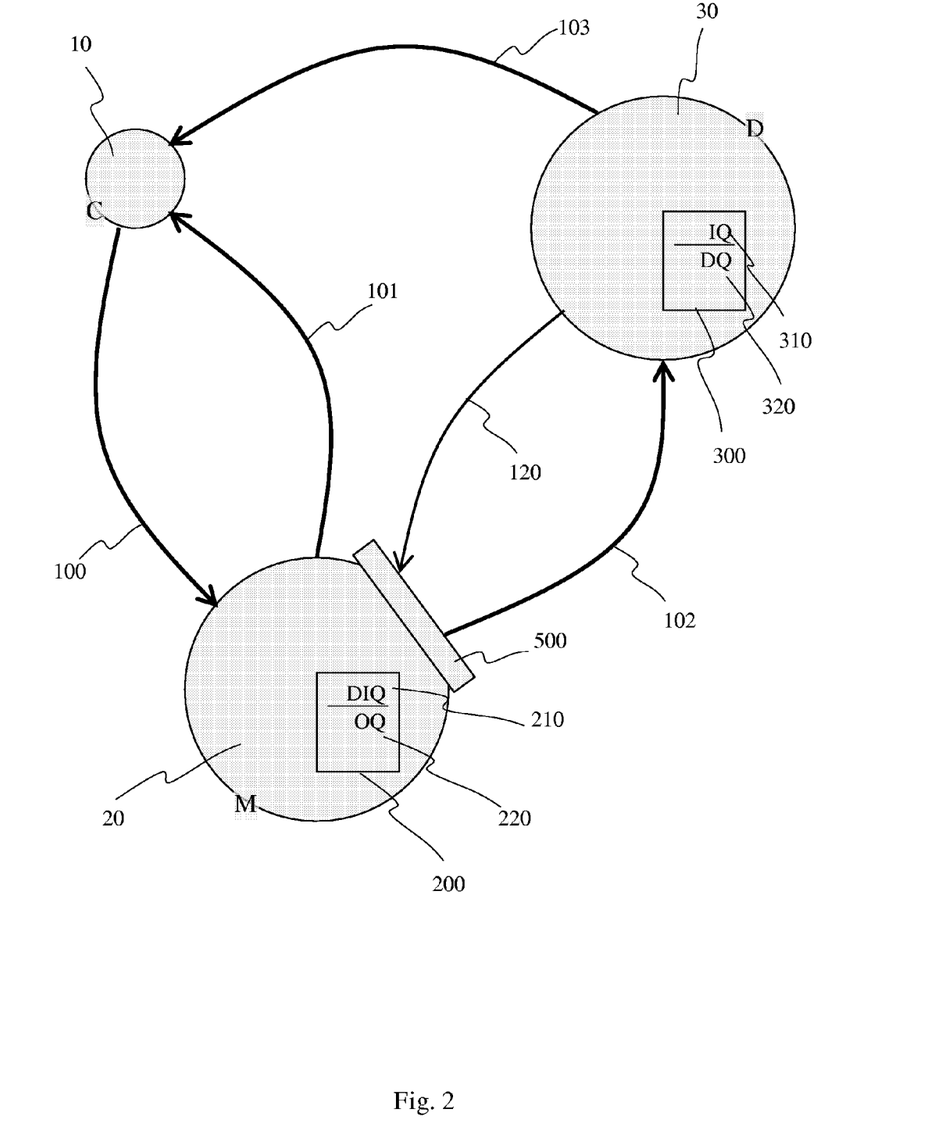
FIG. 2 illustrates a delivery process.

FIG. 2 shows an overview of a delivery process, whereby the customer 10 sends an order to the manufacturer 20, the manufacturer 20 in turn forwards the relevant part of this customer order to the dealer 30 who delivers the ordered goods to the customer 10. In this embodiment, dealer 30 represents a first participant and the manufacturer 20 represents a second participant.

Figure 4:
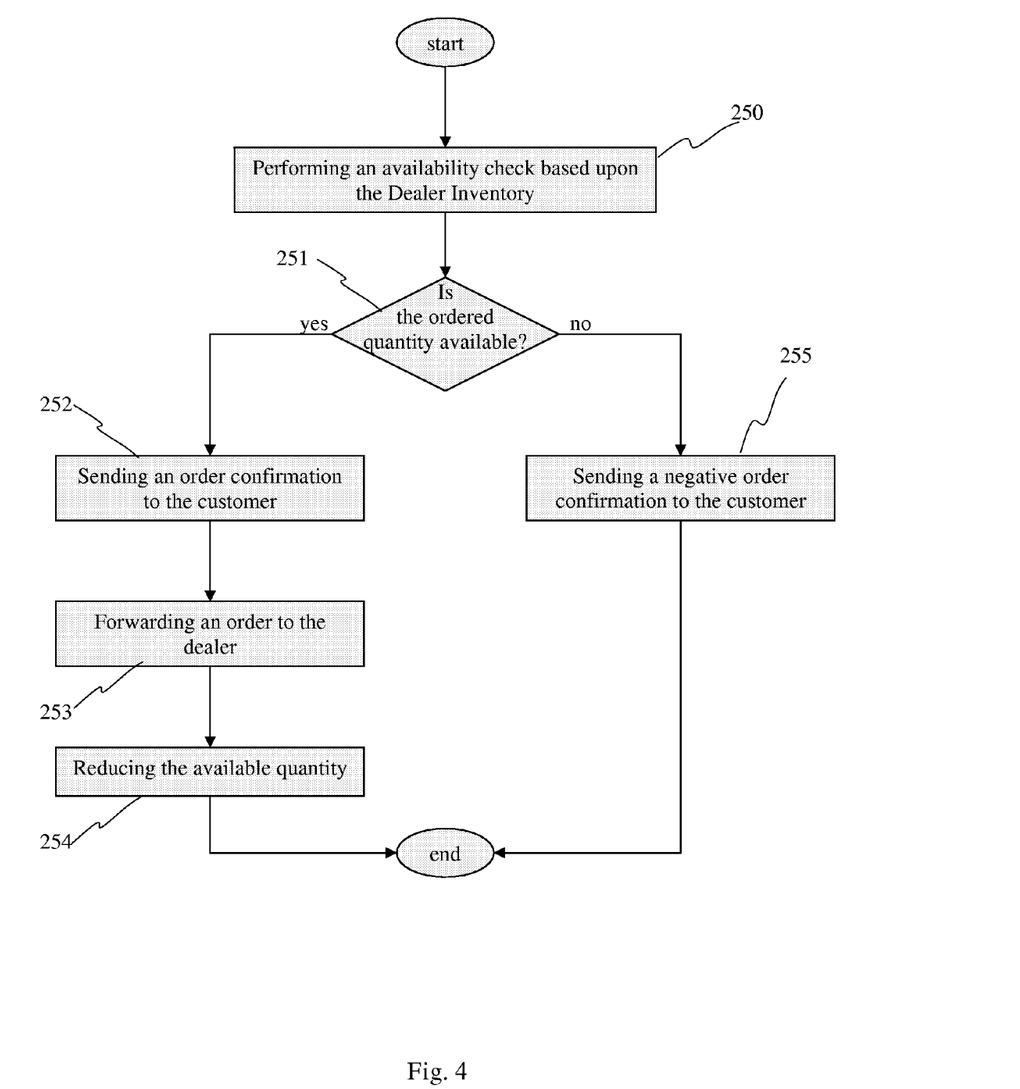
FIG. 4 illustrates the program flow of the method performed with the manufacturer after receiving a customer order.

Customer 10 places an order 100 of a predetermined quantity of goods with the manufacturer 20. The order may be an electronic order transmitted by email or a traditional order transmitted by mail. The order comprises at least information about the ordered product and quantity. Manufacturer 20 feeds the data about the order into a supply chain management system which processes this order. During processing the customer order, the supply chain management system performs a method as shown in FIG. 4. In this embodiment, the method starts with a step 250 of performing an availability check based on the dealer inventory with respect to the ordered quantity of goods. A determination is made at the following step 251 whether the ordered quantity is available.

If the ordered quantity is available, the method continues with step 252 by sending an order confirmation to the customer 10. In FIG. 2, this confirmation is represented by arrow 101. This confirmation may be done by electronic means, e.g. email or EDI or by traditional means like mail or phone. After step 252 the method forwards 253 the relevant part of the customer order to the dealer (shown by arrow 102 in FIG. 2). The forwarding to the dealer may be also done by electronic or traditional means. Before the method terminates, the available quantity of goods within the dealer inventory will be reduced by the ordered quantity in step 254 in FIG. 4.

In case the ordered quantity is not available in the corresponding dealer inventory, the method continues with step 255 by sending a negative order confirmation (represented by arrow 101 in FIG. 2) to the customer. In this case no forwarding of the customer order to the dealer will be done.

Returning to FIG. 2, the dealer 30 is sending 120 his own inventory data 300 to the supply chain management system of the manufacturer 20 using the interface 500 which is located with the supply chain management system. The dealer may also use a supply chain management system or any other computer-system which is able to establish a connection to the interface 500.

At the manufacturer's site 20, the transferred inventory data is stored in a dealer inventory data object 200. A plurality of dealer inventory data objects 200 are stored as time series in one or more data storages. In this embodiment a dealer inventory data object comprises at least the following items:

1. an ID representative of the dealer inventory data object;
2. an ID representative of the owner of the dealer inventory data object;
3. a ID representative of a product;
4. a number representative of the product allocation within this dealer inventory data object (DIQ—Dealer Inventory Quantity);
5. a number representative of the sold quantity of products within the product allocation (OQ—Ordered Quantity.

The first item is the unique identifier of the stored dealer inventory data object. The second item represents the owner of this dealer inventory data object. In other embodiments of the invention, further dealers may participate in the supply chain. So it would be possible that more dealers provide their inventory data to the manufacturer 20. Therefore it is necessary to store the unique identifier of the dealer which owns the dealer inventory data object. The third item represents the unique identifier of the stored product within a dealer inventory data object. The fourth item 210 (DIQ) specifies the product allocation—the quantity of products—of the product within the dealer inventory data object. The fifth item 220 (OQ) represents the sum of the confirmed quantities by the availability checks with respect to this product. The available quantity is given by the difference between the entry of item four and the entry of item five. In one embodiment, step 250 of FIG. 4 comprises to perform an availability check against this difference and step 254 of FIG. 4 comprises to reduce the available quantity by increasing the quantity stored in item five.

In other embodiments the fifth item may not be stored within the dealer inventory data object. In this case the fourth item represents the available quantity of goods and the above mentioned availability check (step 250 of FIG. 4) comprises to perform a check against item four and step 254 of FIG. 4 comprises to reduce the available quantity by decreasing the quantity stored in item four.

Since the dealer inventory data objects are stored as time series, the dealer has the option to maintain different dealer inventory data objects for one product with respect to different time periods, e.g. months. So it would be possible that a dealer provides a quantity of N for a first month and a quantity of M for a second month of a product to the manufacturer. The above mentioned availability check will be done with respect to the viewed time period.

As shown in FIG. 2, the stock is located with the dealer 30. In this embodiment, the dealer 30 uses also a supply chain management system. The stock is stored within this supply chain management system as inventory data objects 300 which comprises at least a first item 310 (IQ—Inventory Quantity) representative of the quantity of products on stock and a second item 320 (DQ—Delivered Quantity) representative of the delivered quantity of products. After receiving the forwarded customer order, the supply chain management system with the dealer performs an availability check against the inventory data objects 300. This second availability check is necessary because the inventory with the dealer 30 must not be the same as the dealer inventory with the manufacturer.

Figure 5:
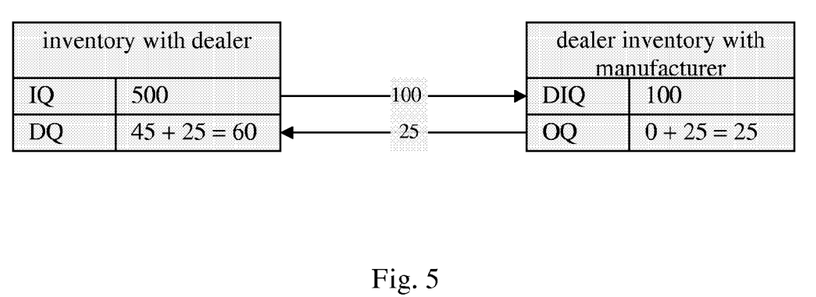
FIG. 5 illustrates an example with two inventories.

FIG. 5 illustrates, as an example, an inventory 300 with the dealer 30 and a dealer inventory 200 with the manufacturer 20. The dealer has 500 pieces of a product on the stock whereby 45 pieces are yet sold. The dealer provides 100 pieces of these 500 pieces to the manufacturer. Initially, the ordered quantity OQ is set equal to 0. After the availability check with respect to 25 required pieces, the ordered quantity OQ is set equal to 25 (0+25). The customer order of 25 pieces is forwarded by the manufacturer to the dealer. After delivering the ordered 25 pieces the delivered quantity DQ is increased to 60 (45+25). This example illustrates that the delivered quantity DQ changes even if no customer order is forwarded by the manufacturer. The dealer can sell his own products directly to his customer without a customer order received from the manufacturer. In this example, dealer sold 45 pieces before the customer order of 25 pieces.

In a preferred embodiment of the invention, the dealer 30 may send an update of his new reduced available quantity to the manufacturer 20. This update may be done simultaneously or delayed. If the update is made delayed, a product shortage is possible and has to be handled by the dealer. In both cases, the dealer 30 uses the interface 500 provided by the supply chain management system located with the manufacturer 20.

The interface 500 is adapted for performing at least one of the following functions, whereby the functions are part of the supply chain management system:
1. inserting a time series comprising one or more dealer inventory data objects into a plurality of data storages;
2. inserting a dealer inventory data object into a time series;
3. updating time series comprising one or more dealer inventory data objects;
4. updating dealer inventory data objects;
5. removing time series from the plurality of data storages in consideration of the owner of the time series;
6. removing a dealer inventory data object from a time series in consideration of the owner of the dealer inventory data object;
7. reading dealer inventory data objects which are owned by other participants;
8. searching the plurality of dealer inventory data objects for one or more dealer inventory data objects with respect to one or more search criteria;
9. displaying one or more dealer inventory data objects;
10. monitoring the plurality of dealer inventory data objects.

Functions 1 to 6 support the update process performed by a dealer. Function 1 provides the possibility for inserting a whole time series comprising at least one dealer inventory data object. The function 2 provides inserting of a new dealer inventory data object into an existing time series. Functions 3 and 4 provide updating of a whole time series or of one dedicated dealer inventory data object respectively. With the functions 5 and 6, a dealer may remove a whole time series or a dealer inventory data object within a time series.

The remaining functions 7 to 10 provide access to dealer inventory data objects which are owned by other dealers. So it is possible to read and display dealer inventory data objects which are owned by other dealers. Function 8 allows searching the plurality of dealer inventory data objects for one or more dealer inventory data objects with respect to one or more search criteria. It is also possible to get an overview which dealer can provide a specific product.

Figure 3:
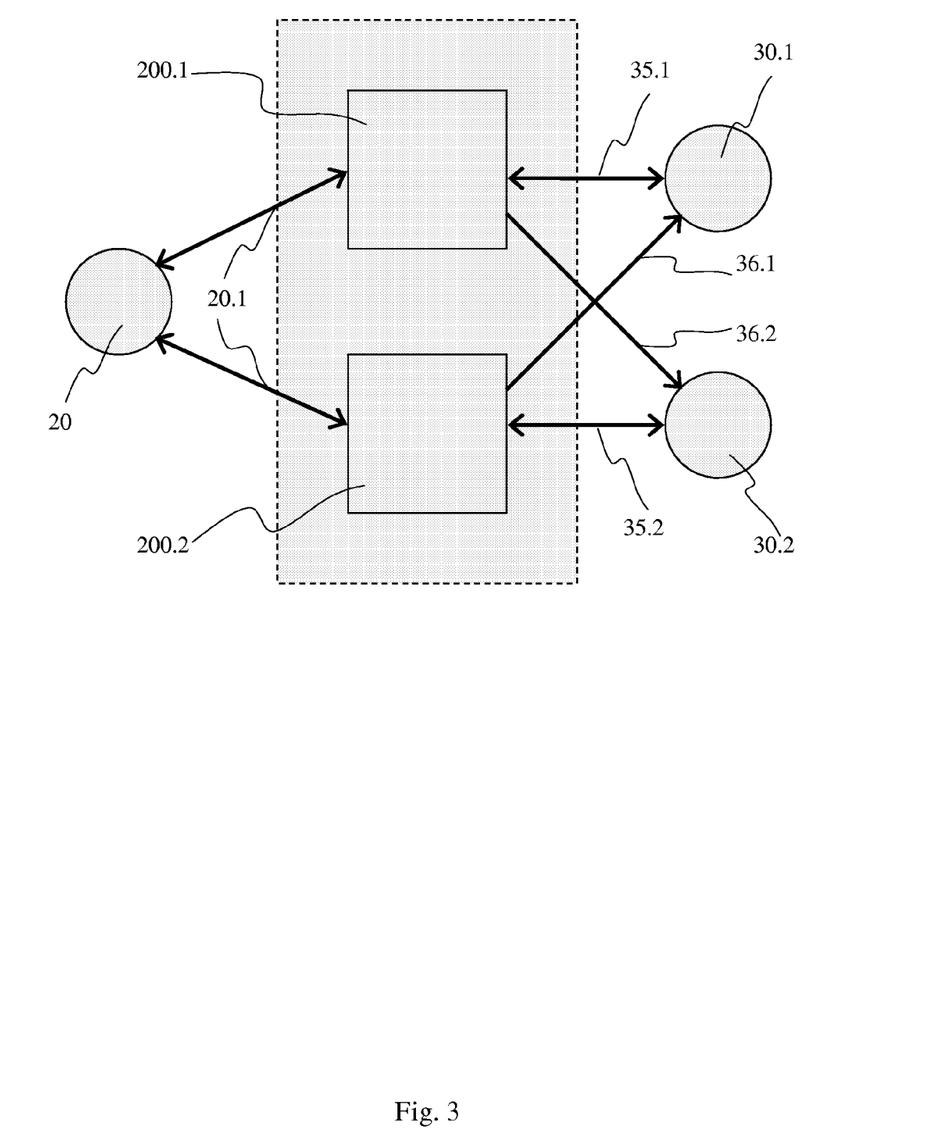
FIG. 3 illustrates the access permissions to several dealer inventory data objects.

In this context the ownership of the dealer inventory data objects and the access rights to these dealer inventory data objects are explained by FIG. 3. This figure shows the manufacturer 20 and two dealers 30.1, 30.2. Furthermore two dealer inventory data objects 200.1, 200.2 are shown. Dealer 30.1 owns the dealer inventory data object 200.1, while dealer 30.2 owns the dealer inventory data object 200.2.

The arrows illustrate the access rights to the dealer inventory data objects 200.1, 200.2. The dealer 30.1 has both write and read permissions 35.1 to the own dealer inventory data object 200.1. For the dealer inventory data object 200.2 the dealer 30.1 has only read permission 36.1. On the other hand, dealer 30.2 has both write and read permissions 35.2 to the own dealer inventory data object 200.2. For the dealer inventory data object 200.1, dealer 30.2 has only read permission 36.2. Dealer 20 who owns neither the dealer inventory data object 200.1 nor the dealer inventory data object 200.2 has both write and read permissions 20.1 to the dealer inventory data objects 200.1, 200.2.

In one embodiment, the manufacturer 20 has the possibility to block the sourcing for special dealers if the dealers do not fulfill contract agreements even if the dealer inventory is available on the supply chain management system. In this case the availability check ignores these dealer inventory data objects. To support this feature, an additional item in the data structure of the dealer inventory data object is necessary. The data structure is extended by a flag indicating as to whether the dealer inventory data object is blocked for the owner. This flag may be set by an internal function. In addition to the above mentioned functions, the interface can provide access to this internal function. Unlike the above mentioned functions, this internal function can be accessed by the manufacturer 20 only.

The interface 500 supports a flexible and efficient online collaboration between a manufacturer and one ore more dealers.

In other embodiments further characteristics, e.g. 'sellable' or 'non sellable', may be stored within the data structure of a dealer inventory data object. The value 'sellable' indicates that the product stored in an inventory data object may be sold by the manufacturer. The value 'non sellable' indicates that the product stored in an inventory data object cannot be sold by the manufacturer. For other dealers these non-sellable products are visible by using the online collaboration. Using the online collaboration other dealers may enter into negotiations—and the data is provided by dealer inventory data object located with the manufacturer.

The interface 500 may provide access to further functions in addition to the above mentioned functions. This gives the collaboration aspect more flexibility.

The supply chain management system with the manufacturer 20 and the computer-systems with the dealers 20 are connected by a communication network, e.g. LAN, WAN or Internet.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

The invention claimed is:

1. A computer-implemented method to maintain a plurality of dealer inventories in a supply chain management system having a plurality of participants, the method comprising:
    sharing a plurality of dealer inventory data objects that represent the plurality of dealer inventories within the supply chain management system, wherein the plurality of dealer inventory data objects, located with the supply chain management system of a second participant, are owned by a first participant;
    providing a plurality of interfaces, by a computer processor, to permit access to the plurality of dealer inventory data objects;
    granting the first participant read and write access through the plurality of interfaces to the plurality of dealer inventory data objects;
    granting the second participant read and write access to the plurality of dealer inventory data objects via the plurality of interfaces;
    granting additional participants read and write access to the plurality of dealer inventory data objects via the plurality of interfaces; and
    supporting online collaboration through the plurality of interfaces among the additional participants, the first participant, and the second participant.

2. The computer-implemented method of claim 1, wherein the interfaces permit a participant to perform at least one of the following:
    insert a time series comprising one or more dealer inventory data objects into a plurality of data storages;
    insert a dealer inventory data object into the time series;
    update a time series comprising one or more dealer inventory data objects;
    update a dealer inventory data object;
    remove a time series from the plurality of data storages in consideration of the owner of the time series;
    remove a dealer inventory data object from a time series in consideration of the owner of the dealer inventory data object;
    read dealer inventory data objects which are owned by other participants;
    search the plurality of dealer inventory data objects for one or more dealer inventory data objects with respect to one or more search criteria;
    display one or more dealer inventory data objects; and
    monitor the plurality of dealer inventory data objects.

3. The computer-implemented method of claim 1, wherein the first participant is a dealer and the second participant is a manufacturer.

4. The computer-implemented method of claim 1, wherein an entry for a dealer inventory data object comprises:
   an ID representative of the dealer inventory data object;
   an ID representative of the owner of the dealer inventory data object;
   an ID representative of a product;
   a number representative of the product allocation within the dealer inventory data object;
   a number representative of the sold quantity of products within the product allocation.

5. The computer-implemented method of claim 4, wherein the dealer inventory data object further comprises a flag to indicate whether the dealer inventory data object is blocked for an owner.

6. The computer-implemented method of claim 1, further comprises:
   storing the dealer inventory data objects as one or more time series.

7. The computer-implemented method of claim 1 further comprising:
   performing an availability check based upon the dealer inventory;
   checking whether the ordered quantity of goods is available within the dealer inventory;
   confirming the customer order by the second participant if the ordered quantity of goods is available within the dealer inventory;
   reducing the available quantity of products within the dealer inventory data objects if the ordered quantity of goods is available within the dealer inventory;
   forwarding the relevant part of the customer order to the first participant if the ordered quantity of goods is available within the dealer inventory; and
   rejecting the customer order by the second participant if the ordered quantity of goods is not available within the dealer inventory.

8. A computer-framework for maintaining a plurality of dealer inventory data objects in a supply chain management environment comprising:
   at least one supply chain management system;
   one or more computer-implemented data storages to store the plurality of dealer inventory data objects;
   a plurality of means for accessing and processing the plurality of dealer inventory data objects; and
   an interface providing concurrent access to the plurality of means for accessing.

9. The computer-framework of claim 8, wherein the plurality of means comprises:
   means for inserting a time series including one or more dealer inventory data objects into a plurality of data storages;
   means for inserting a dealer inventory data object into the time series;
   means for updating a time series comprising one or more dealer inventory data objects;
   means for updating a dealer inventory data object;
   means for removing a time series from the plurality of data storages in consideration of the owner of the time series;
   means for removing a dealer inventory data object from a time series in consideration of the owner of the dealer inventory data object;
   means for reading dealer inventory data objects which are owned by other participants;
   means for searching the plurality of dealer inventory data objects for one or more dealer inventory data objects with respect to one or more search criteria;
   means for displaying one or more dealer inventory data objects; and
   means for monitoring the plurality of dealer inventory data objects.

10. The computer-framework of claim 9, further comprising:
    means for checking the availability based upon the dealer inventory;
    means for checking as to whether the ordered quantity of goods is available within the dealer inventory;
    means for confirming the customer order by the second participant if the ordered quantity of goods is available within the dealer inventory;
    means for reducing the available quantity of products within the dealer inventory data objects if the ordered quantity of goods is available within the dealer inventory;
    means for forwarding the relevant part of the customer order to the first participant if the ordered quantity of goods is available within the dealer inventory; and
    means for rejecting the customer order by the second participant if the ordered quantity of goods is not available within the dealer inventory.

11. A computer readable storage medium comprising program code which when executed causes the computer to:
    insert a time series comprising one or more dealer inventory data objects into a plurality of data storages implemented by a computer;
    insert a dealer inventory data object into the time series;
    update the time series comprising one or more dealer inventory data objects;
    update the dealer inventory data object;
    remove the time series from the plurality of data storages in consideration of the owner of the time series;
    remove the dealer inventory data object from the time series in consideration of the owner of the dealer inventory data object;
    read dealer inventory data objects which are owned by other participants;
    search the plurality of dealer inventory data objects for one or more dealer inventory data objects with respect to one or more search criteria;
    display one or more dealer inventory data objects; and
    monitor the plurality of dealer inventory data objects.

12. The computer readable storage medium of claim 11, further comprising program code which when executed causes the comprising to:
    check the availability based upon the dealer inventory;
    check as to whether the ordered quantity of goods is available within the dealer inventory;
    confirm the customer order by the second participant if the ordered quantity of goods is available within the dealer inventory;
    reduce the available quantity of products within the dealer inventory data if the ordered quantity of goods is available within the dealer inventory;
    forward the relevant part of the customer order to the first participant if the ordered quantity of goods is available within the dealer inventory; and
    reject the customer order by the second participant if the ordered quantity of goods is not available within the dealer inventory.

* * * * *